Patented May 3, 1932

1,856,657

UNITED STATES PATENT OFFICE

CHARLES J. ROMIEUX, OF ELIZABETH, NEW JERSEY, ASSIGNOR TO AMERICAN CYANAMID COMPANY, OF NEW YORK, N. Y., A CORPORATION OF MAINE

FUMIGATING COMPOSITION

No Drawing. Application filed December 12, 1928. Serial No. 325,666.

This invention relates to a fumigant and more particularly to a fumigant comprising a carrier impregnated with hydrocyanic acid.

It has been suggested in the past that liquid hydrocyanic acid may be absorbed in various porous bodies in powder or dust form, from which the hydrocyanic acid may be obtained by exposure to the air. However, the absorbents previously used are open to a number of objections.

I have found that granular, calcined or burnt clayey or siliceous products are particularly adapted as absorbents for hydrocyanic acid and have many advantages over the products of the prior art.

Specifically, I have found that a mass of granular, calcined clay brick of about 16 mesh and having absorbed therein about 45%, by weight, of hydrocyanic acid, gives a mixture suitable for fumigation purposes. The mixture may be placed in suitable cans or receptacles which are adapted to be maintained in a gas-tight condition until the contents are to be used. At such time, the can or like receptacle is opened and the desired quantity of material removed and placed in the fumigating room or chamber where it gives off gaseous hydrocyanic acid which performs the desired fumigating function.

The absorbent contemplated for use in the present invention is granular, calcined or burnt clay brick, with or without other calcined granular siliceous products such as the granular material obtained by crushing calcined brick made from infusorial earth, or this material alone. The calcined material is particularly valuable because of the porous nature of the material resulting from treatment at high temperatures during calcination or burning. This is one of the features which makes these substances good absorbents.

The granular absorbent is preferably of 6 to 20 mesh. Finer material than this is in the nature of a powder which, after the absorption of the liquid hydrocyanic acid, becomes wet and soggy with the resulting undesirable qualities apparent in handling the material. Materials of a large size than those contemplated for use in the present invention are generally of such a nature that they do not absorb sufficient liquid hydrocyanic acid to make them adaptable for ready use; or when the larger sized materials do absorb sufficient hydrocyanic acid, the size of the materials prevents ready vaporization of the liquid hydrocyanic acid with the result that the fumigating time is necessarily much greater in order to utilize all of the contained hydrocyanic acid. I have found that material in the form of granules of about 16 mesh is best adapted for the present invention.

The fumigating mixture should preferably contain between 30 and 50% hydrocyanic acid, by weight, 45% being the specific quantity most often utilized. The present invention is likewise adapted for use with other fumigants or mixtures.

In accordance with fumigating practice it is preferable to mix with the hydrocyanic acid a material which volatilizes with the hydrocyanic acid in use so as to give warning of the presence of hydrocyanic acid in the fumigating chamber. This warning material may be of any desired nature, for example, it has been found that chloropicrin is a material well adapted for use in the present composition. This material is employed in amounts of about 2 to 3%, based upon the weight of the entire fumigating mixture.

Suitable stabilizing agents may be added to the mixture to prevent decomposition of the hydrocyanic acid. Sulfuric acid, oxalic acid and the like are among those which may be employed for this purpose.

It is to be understood that the present invention is not limited to the exact details set forth since many modifications may be made without departing from the spirit and scope of the invention.

I claim:

1. A fumigant comprising particles of calcined brick and liquid hydrocyanic acid absorbed in the particles.

2. A fumigant comprising granular particles of calcined brick and liquid hydrocyanic acid absorbed in the granules.

3. A fumigant comprising granular particles of calcined brick, liquid hydrocyanic acid and chloropicrin absorbed in the granules.

4. A fumigant comprising granular particles of calcined clay brick of 6 to 20 mesh, and liquid hydrocyanic acid absorbed in the granules.

5. A fumigant comprising granular particles of calcined clay brick of 6 to 20 mesh, and 30 to 50% of liquid hydrocyanic acid absorbed in the granules.

6. A fumigant comprising granular particles of calcined clay brick of 6 to 20 mesh, and 40 to 50% of liquid hydrocyanic acid absorbed in the granules.

7. A fumigant comprising granular particles of calcined clay brick of 6 to 20 mesh, and 45% of liquid hydrocyanic acid absorbed in the granules.

8. A fumigant comprising calcined brick granules of about 16 mesh having absorbed therein 30 to 50% liquid hydrocyanic acid and 2 to 3% chloropicrin, all by weight.

9. A fumigant comprising a mixture of granules of calcined clay brick and of infusorial earth brick, and 30 to 50% of liquid hydrocyanic acid absorbed in the granules.

In testimony whereof, I have hereunto subscribed my name this 11th day of December, 1928.

CHARLES J. ROMIEUX.